United States Patent [19]
Houston et al.

[11] Patent Number: 5,531,478
[45] Date of Patent: Jul. 2, 1996

[54] SPIDER WEB CLEARING DEVICE FOR ALL-TERRAIN VEHICLES

[76] Inventors: Rocky J. Houston, P.O. Box 418, Kingston, Tenn. 37763; Clifford L. Houston, 412 Barnard Narrows Rd., Ten Mile, Tenn. 37880

[21] Appl. No.: 237,270

[22] Filed: May 3, 1994

[51] Int. Cl.⁶ .................................................. B60R 21/02
[52] U.S. Cl. ........................ 280/762; 280/756; 293/143
[58] Field of Search ...................... 180/313; 280/288.4, 280/756, 762, 770; 293/112, 123, 143, 146; 296/77.1

[56] References Cited

U.S. PATENT DOCUMENTS

| | | | |
|---|---|---|---|
| 1,107,832 | 8/1914 | Palis | 280/770 |
| 2,175,502 | 10/1939 | Campbell | 293/143 X |
| 2,281,215 | 4/1942 | Van Auken | 293/143 X |
| 3,135,546 | 6/1964 | Gottfried et al. | 296/102 |
| 3,552,514 | 1/1971 | Alpers | 293/146 X |
| 3,672,700 | 6/1972 | Marose | 280/762 |
| 3,704,031 | 11/1972 | Confer | 280/756 |
| 3,743,316 | 7/1973 | Stotesbery | 280/756 X |
| 3,770,293 | 11/1973 | Anderson | 280/762 |
| 3,782,766 | 1/1974 | Teel | 280/770 X |
| 4,037,614 | 7/1977 | Hines et al. | 135/5 A |
| 4,560,196 | 12/1985 | Carter, Sr. | 296/102 |
| 4,778,214 | 10/1988 | Fu | 296/102 |
| 4,950,017 | 8/1990 | Norton | 296/77.1 |
| 5,086,858 | 2/1992 | Mizuta et al. | 280/756 X |
| 5,174,622 | 12/1992 | Gutta | 280/756 X |

FOREIGN PATENT DOCUMENTS

| | | |
|---|---|---|
| 830462 | 2/1952 | Germany . |
| 2096955 | 10/1982 | United Kingdom . |

*Primary Examiner*—Brian L. Johnson
*Attorney, Agent, or Firm*—Pitts & Brittian

[57] ABSTRACT

A spider web clearing device for clearing spider webs from the path of an all-terrain vehicle. The spider web clearing device includes a flexible elongated member having an upper end and a lower end, wherein one end defines a distal end that is free to flex. A prong member is disposed on the upper end of the elongated member and an attachment assembly is carried by the lower end of the elongated member for mounting the elongated member to the bumper of an ATV. A stop member is carried by a clamp assembly in order to reduce whipping motion induced by impact of branches on the spider web clearing device. The spider web clearing device is mounted on the ATV in a manner that places the elongated member forward of the rider. In one embodiment, a single spider web clearing device is mounted proximate the center of the front bumper. However, in the preferred embodiment, a spider web clearing device is mounted on each end of the bumper or rack at the front of the ATV.

8 Claims, 3 Drawing Sheets

5,531,478

SPIDER WEB CLEARING DEVICE FOR ALL-TERRAIN VEHICLES

TECHNICAL FIELD

This invention relates to the field of devices for protecting riders of all-terrain vehicles. More specifically, it relates to a device that removes spider webs from the path of an all-terrain vehicle.

BACKGROUND ART

All-terrain vehicles (ATVs), both three-wheeled and four-wheeled, have become very popular among outdoorsmen and hunters as well as ATV enthusiasts. ATVs are frequently ridden through wooded areas and are not dependent on trails or roads. As such, riders of ATVs are frequently, exposed to spider webs. At best, unexpectedly riding through a spider web is an inconvenience, as web is difficult to remove from the face, hair, clothing and/or goggles or helmet visor. At worst, this event can be dangerous inasmuch as there is an attendant risk of being bitten by a spider. There is also a risk of an accident occurring as a result of the driver being momentarily distracted by the web. What is needed is a readily attachable device that removes spider webs from the path of an ATV without significantly impairing the rider's vision and without requiring cleaning web from a windshield-type device.

Many devices have been disclosed for protecting the riders of such vehicles as bicycles, golf carts, strollers and ATVs from the elements. In this regard, in U.S. Pat. No. 3,135,546 issued to Gottfried et al. on Jun. 2, 1964, a frame for a canopy for an infant's stroller for protecting a child in the stroller from rain, wind or the like is disclosed.

In U.S. Pat. No. 4,037,614 issued to Hines et al. on Jul. 26, 1977, a canopy for a vehicle such as a golf cart is disclosed. The canopy is supported by a plurality of upstanding support posts carried by the vehicle. The canopy is flexible and is arched such that the canopy assumes a saddle-like or generally hyperbolic parabaloid shape.

In U.S. Pat. No. 4,560,196 issued to Carter Sr. on Dec. 24, 1985, a convertible top for a motorcycle is disclosed. Similarly, in U.S. Pat. No. 4,778,214 issued to Fu on Oct. 18, 1988 a shield apparatus for a motorcycle is disclosed that includes a top cover.

In U.S. Pat. No. 4,950,017 issued to Norton on Aug. 21, 1990, a kit which provides a removable top assembly for ATVs and the assembled top is disclosed. The top is supported by a pair of lateral upright support members fixed to a rear portion of the vehicle, forward and rearward generally U-shaped upright support bows coupled to the lateral supports and a forwardly extending generally horizontal support bow coupled to an upper region of the lateral supports. A front windscreen can also be provided.

In UK Pat. Application 2096955, published on Oct. 27, 1982, M. J. Kitson discloses a removable canopy for a bicycle. Kitson's canopy includes a hood secured to a rectangular hood frame and supported at the corners by supporting struts which are carried by two attachment members clamped to the bicycle frame below the handlebars and below the seat. And, German patent no. 830462 appears to disclose a frame for a canopy for a tractor.

None of these devices disclose a flexible device having a free distal end for removing spider webs from the path of the vehicle for keeping the spider webs out of the rider's face or off of the vehicle's windscreen. Accordingly, it is an object of this invention to provide a flexible device having a free distal end capable of removing spider webs from the path of an ATV or similar vehicle for keeping spider webs out of a rider's face or off of the vehicle's windscreen.

Another object of the present invention is to provide such a device without significantly obscuring a rider's field of vision.

Yet another object of the present invention is to provide such a device that is readily attachable to and removable from a typical ATV.

Other objects and advantages over the prior art will become apparent to those skilled in the art upon reading the detailed description together with the drawings, as described as follows.

DISCLOSURE OF THE INVENTION

In accordance with the various features of this invention, a spider web clearing device is provided. The spider web clearing device includes an elongated member having an upper end and a lower end. A prong member is disposed on the upper end of the elongated member and clamping means are carried by the lower end of the elongated member for clamping the elongated member to the front bumper of an ATV. A stop member is carried by the clamping means in order to reduce whipping motion induced by impact of branches on the spider web clearing device. The distal end of the spider web clearing device is free and the spider web clearing device is constructed of a flexible material such as fiberglass such that the spider web clearing device is free to flex, reducing the possibility of breakage, upon contact with branches or the like. The spider web clearing device is mounted on the ATV in a manner that places the elongated member forward of the rider. In one embodiment, a single spider web clearing device is mounted proximate the center of the front bumper. However, in the preferred embodiment, a spider web clearing device is mounted on each end of the bumper or rack at the front of the ATV.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 2:
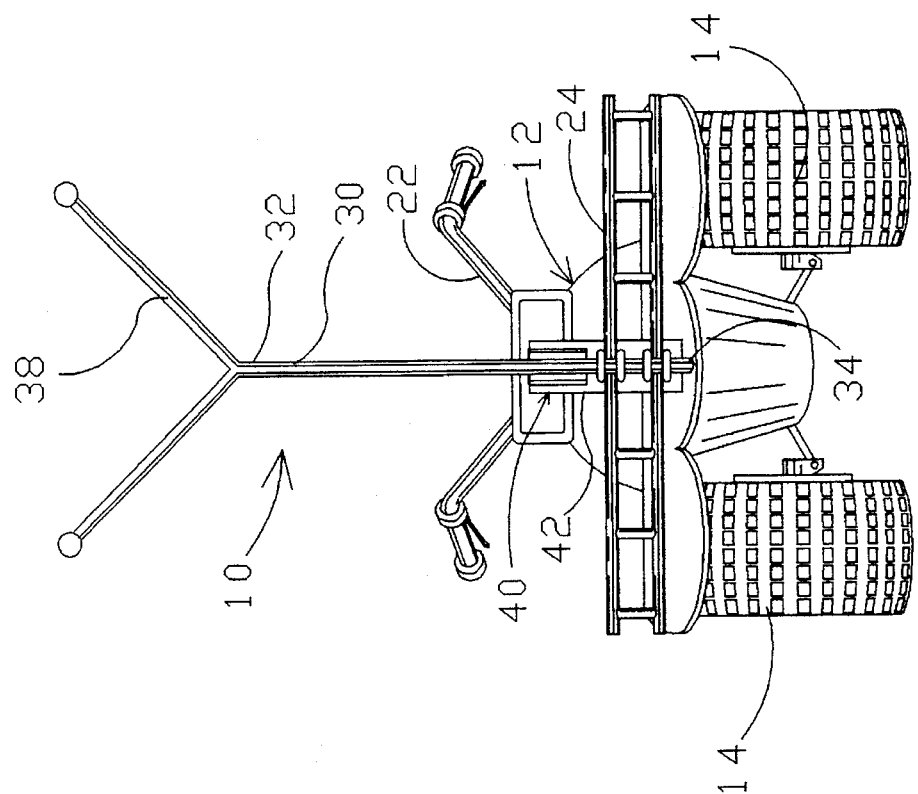
FIG. 2 illustrates a front view of an ATV having a single spider web clearing device mounted in the center of the front bumper.

A spider web clearing device constructed in accordance with the present invention is illustrated generally as 10 in the figures. A four-wheeled ATV of conventional construction is illustrated generally as 12 in the figures. It will be understood that ATV 12 includes front and rear pairs of wheels 14, 16, respectively, a mid-mounted engine 18 for providing power to the drive wheels, a seat 20 for supporting a rider/driver (not shown) a handle bar assembly 22 and front and rear rack-type bumpers 24, 26, respectively.

Spider web clearing device 10 includes an elongated member 30 having an upper end 32 and a lower end 34. Elongated member 30 is preferably constructed of a strong, yet flexible material, such as, but not limited to, plastic fiberglass or the like, such that spider web clearing device 10 is free to flex. A prong member 38, which is preferably Y-shaped or V-shaped, is disposed on upper end 32 of elongated member 30 and clamping means such as attachment assembly 40 are carried by lower end 34 of elongated member 30 for releasably attaching elongated member 30 to ATV 12 such that elongated member 30 and associated prong member 38 are forward of the rider. In the preferred embodiment, elongated member 30 is mounted to front bumper 24 of ATV 12. Also in the preferred embodiment, upper end 32 of elongated member 30 defines a distal end and is free to flex upon impact by a tree branch or the like, thus reducing the possibility of breaking elongated member 30.

Attachment assembly 40 includes a mounting plate 42 and a plurality of U-bolts 48 and associated threaded nuts 49. It will be understood by those skilled in the art that mounting plate 42 is disposed on one side of bumper 24 and the elongated member 30 is disposed on the opposite side of bumper 24 while U-bolts 48 maintain elongated member 30 against bumper 24. Those skilled in the art will readily recognize that other arrangements of assemblies will releasably secure elongated member 30 to bumper 24.

As is discussed above, elongated member 30 is constructed of a flexible material and has a free distal end. Those skilled in the art will recognize that this will induce a back and forth whipping motion in elongated member 30 when elongated member 30 impacts tree branches and the like which are common in the off-road environment. In order to reduce or dampen this whipping motion, a stop member 52 is carried by attachment assembly 40. In this regard, stop member 52 is constructed of a resilient material, such as rubber, and, preferably, is releasably secured to mounting plate 42 by threaded fasteners 54 which, in the preferred embodiment, are received within countersunk regions 58 on stop member 52. Also, in the preferred embodiment, stop member 52 has a vertical groove 60 in which elongated member 30 is received.

Figure 1:
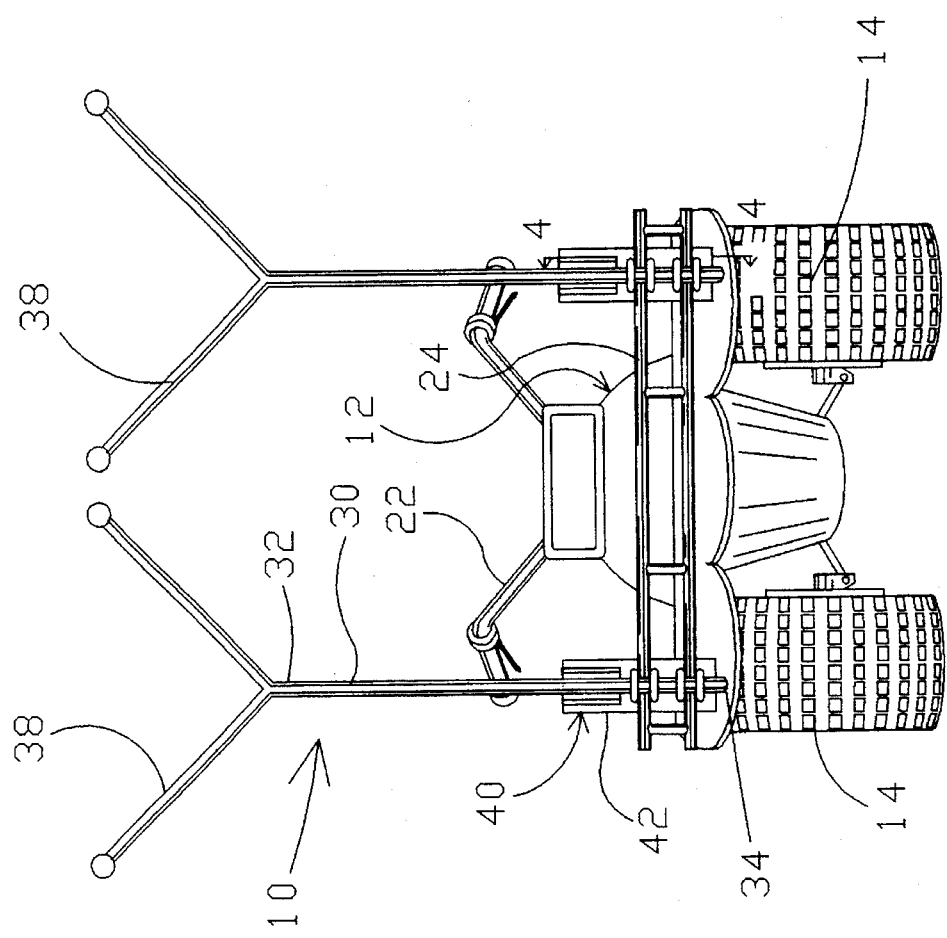
FIG. 1 illustrates a front view of an ATV having a plurality of spider web clearing devices mounted on each side of the front bumper.
Figure 3:
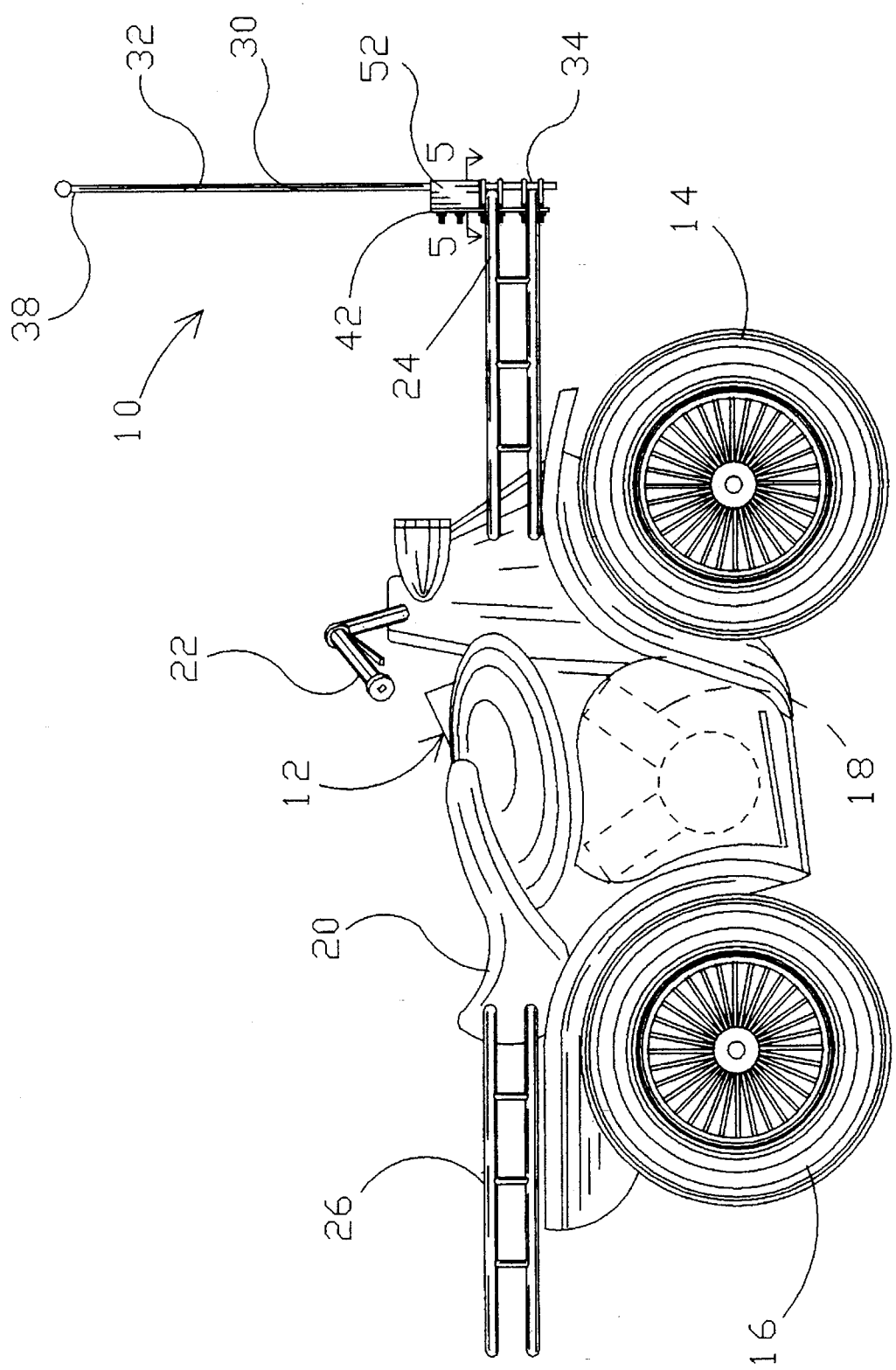
FIG. 3 illustrates a side view of an ATV showing the clamping means and associated stop member of the present invention.
Figure 4:
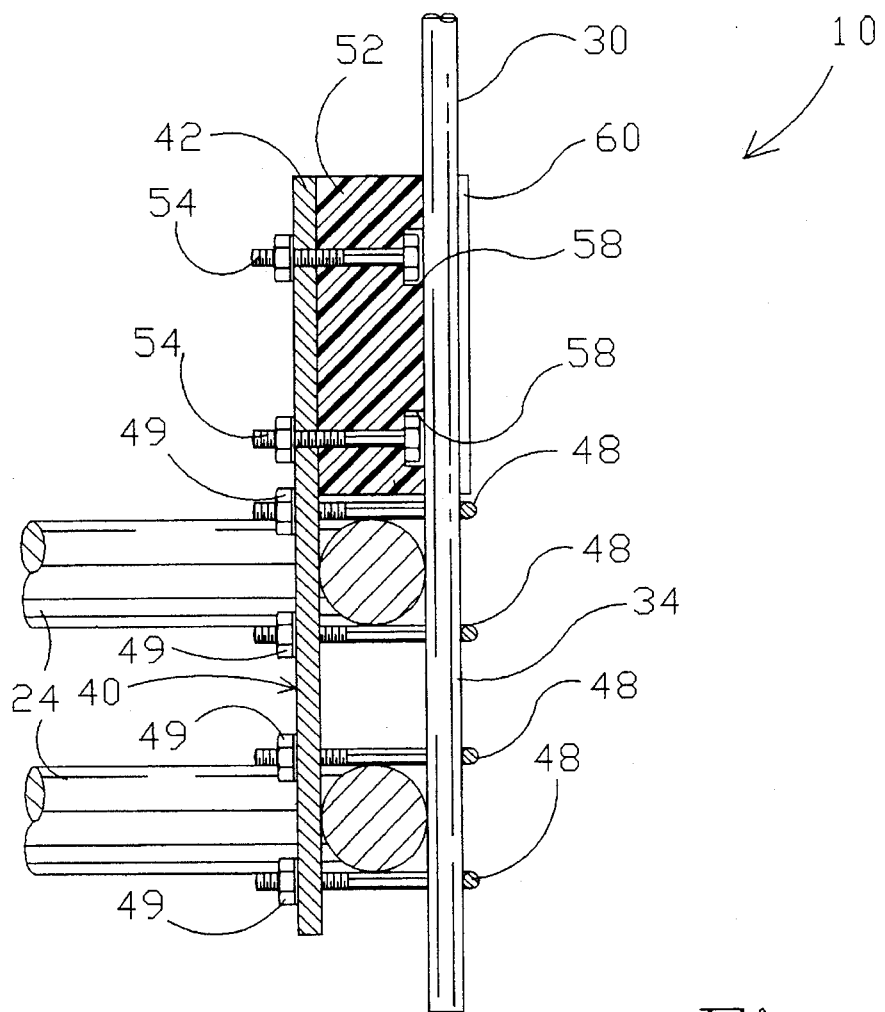
FIG. 4 illustrates a sectional view taken along line 4—4 in FIG. 1.
Figure 5:
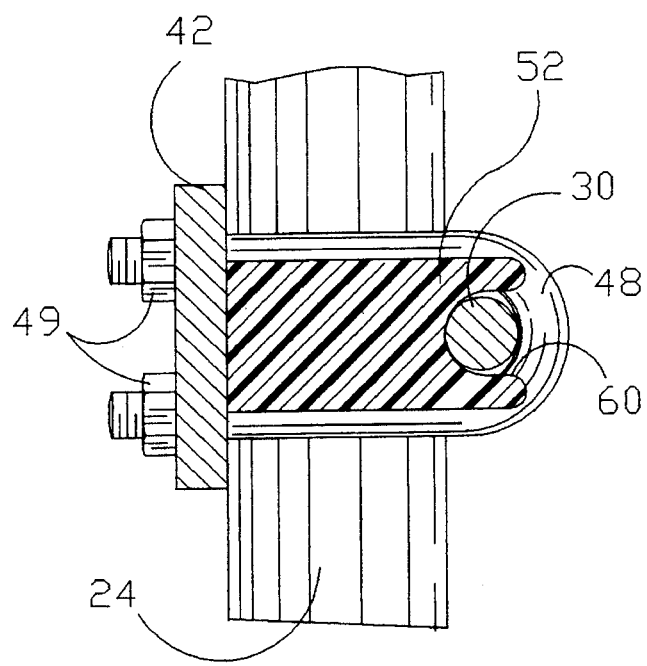
FIG. 5 illustrates a sectional view taken along line 5—5 in FIG. 3.

In the preferred embodiment, a spider web clearing device 10 is mounted on each side of bumper 24 on ATV 12 as seen in FIG. 1. However, in an alternate embodiment, seen in FIG. 2, a single spider web clearing device 10 is mounted proximate the center of front bumper 24.

From the foregoing description, it will be recognized by those skilled in the art that a spider web clearing device offering advantages over the prior art has been provided. Specifically, the spider web clearing device provides a device capable of removing spider webs from the path of an ATV or similar vehicle for keeping spider webs out of a rider's face or off of the vehicle's windscreen. Additionally, the spider web clearing device provides such a device without significantly obscuring a rider's field of vision and that can be readily attached to and removed from a typical ATV.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A spider web clearing device for clearing spider webs from a path of an all-terrain vehicle, said all-terrain vehicle having at least a front bumper and a rear bumper, said spider web clearing device comprising;

a flexible elongated member defining an upper end and a lower end wherein one end defines an attached end and one end defines a forked distal end;

clamping means for detachably mounting said spider web clearing device to the all-terrain vehicle such that said elongated member is forward of a rider of the all-terrain vehicle, wherein said clamping means is disposed proximate said attached end of said flexible elongated member a stop member constructed of a resilient material, said stop member being carried by said clamping means, wherein said stop member includes a vertical groove for receiving said flexible elongated member.

2. The spider web clearing device of claim 1 wherein said spider web clearing device is mounted proximate the center of the from bumper of the all-terrain vehicle.

3. The spider web clearing device of claim 1 wherein a spider web clearing device is mounted on each side of the front bumper of the all-terrain vehicle.

4. The spider web clearing device of claim 1 wherein a spider web clearing device further comprises a prong member disposed on said distal end of said flexible elongated member.

5. A spider web clearing device for clearing spider webs from a path of an all-terrain vehicle, said all-terrain vehicle having at least a front bumper and a rear bumper, said spider web clearing device comprising;

a flexible elongated member defining an upper end and a lower end, wherein one end defines an attached end and one end defines a distal end;

an attachment assembly for detachably mounting said spider web clearing device to the all-terrain vehicle such that said elongated member is forward of a rider of the all-terrain vehicle, wherein said attachment assembly is disposed proximate said attached end of said flexible elongated member; and a stop member carried by said-attachment assembly, said stop member including a vertical groove for receiving said flexible elongated member, wherein said stop member is constructed of a resilient material.

6. The spider web clearing device of claim 5 wherein said spider web clearing device further comprises a prong member disposed on said distal end of said flexible elongated member.

7. The spider web clearing device of claim 5 wherein said upper end of said flexible elongated member defines said distal end.

8. The spider web clearing device of claim 5 wherein said attachment assembly detachably secures said spider web clearing device to the front bumper of the all-terrain vehicle.

\* \* \* \* \*